P. SHAW.
Steam Plow.
No. 10,646.
Patented Mar. 14, 1854.
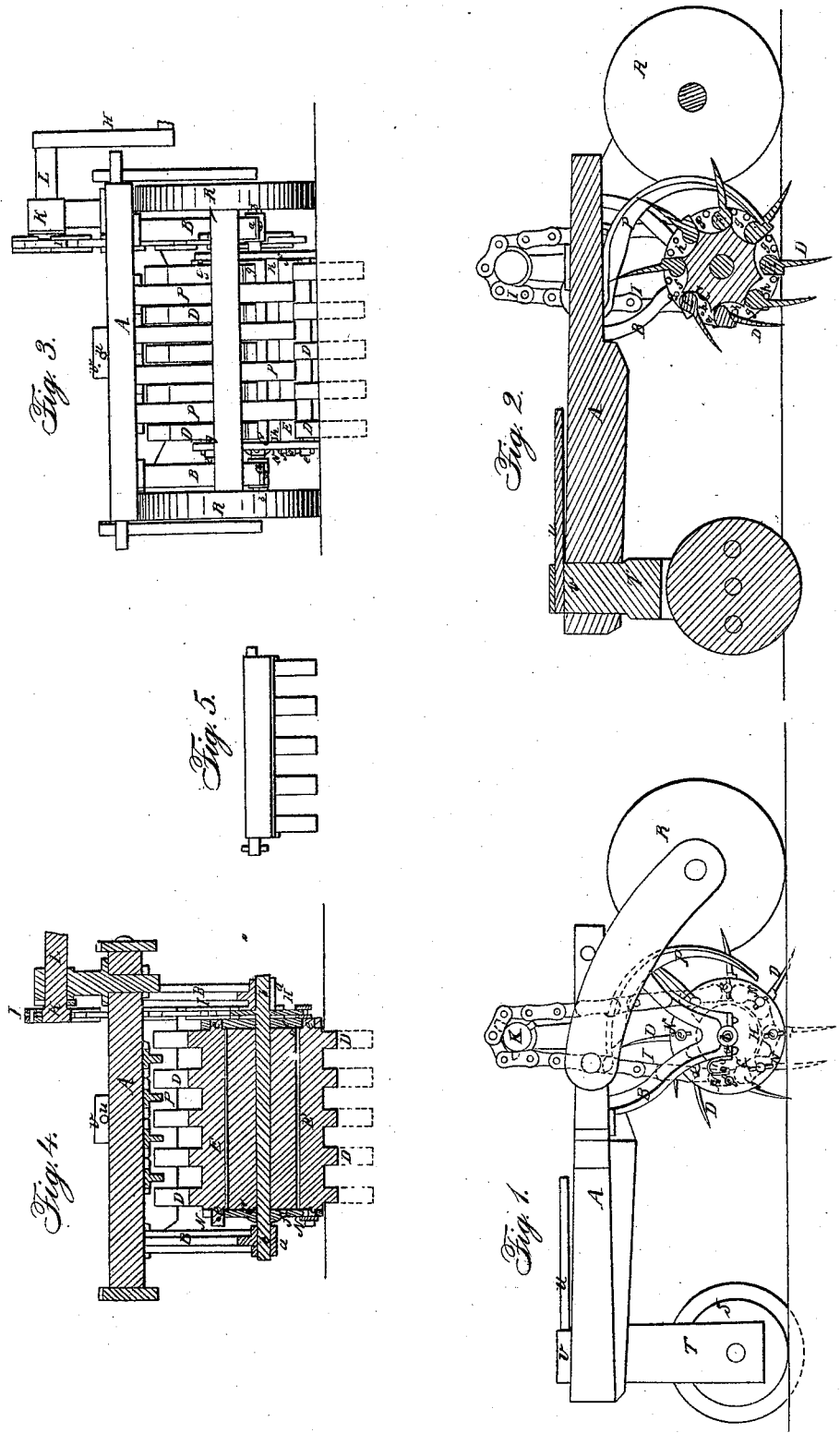

UNITED STATES PATENT OFFICE.

PHILANDER SHAW, OF ABINGTON, MASSACHUSETTS.

IMPROVEMENT IN ROTARY CULTIVATORS.

Specification forming part of Letters Patent No. 10,616, dated March 14, 1854.

*To all whom it may concern:*

Be it known that I, PHILANDER SHAW, of Abington, in the county of Plymouth and State of Massachusetts, have invented a new and useful improved machine for plowing or breaking up land and preparing it for the reception of seed; and I do hereby declare that the same is fully described and represented in the following specification and the accompanying drawings, letters, figures, and references thereof.

Of the said drawings, Figure 1 denotes a side elevation, Fig. 2 a central longitudinal and vertical section, and Fig. 3 a rear elevation, of my said plowing-machine. Fig. 4 is a transverse and vertical section taken through the shaft of the rotary frame. Fig. 5 is a side view of one of the sets of spades.

In the said drawings, A represents a strong platform or carriage, which is provided with struts B B, that extend down from it and serve to sustain by boxes $a\,a$ at their lower ends the journals $b\,b$ of a rotary frame, C. This rotary frame supports and carries one or more sets, D D, &c., of spades. Each of these sets of spades is composed of a series of strong blades or spades, $d\,d\,d$, &c., made to project from a shaft, E, whose journals $e\,e$ are sustained by and turn in the two heads or ends $f\,f$ of the frame C. The range of rotary motion of the shaft E of each set of spades in its bearings is a sector of a circle, and is limited by two studs, $g\,h$, applied to either or both heads of the frame and on opposite sides of the shaft, as seen in Fig. 2.

On the main shaft of the rotary frame C there is fixed a sprocket-wheel, H, that is made to engage with an endless chain, I, that traverses around a sprocket-pinion, K, fixed on a driving-shaft, L, arranged on or above the platform or carriage, and driven by a steam-engine or other suitable power placed on the platform and applied to a crank, M, extended from the said driving-shaft.

A pin or stud, N, is extended from one of the journals of each of the set of spades, as seen in Fig. 1, and there is a bent spring-cam, O, that is extended from or fastened to one of the struts B B, and made in relation to the several journals, $e\,e$, that extend through one of the heads of the frame C, to stand or be arranged as seen in Fig. 1.

There is a set of clearers, P P, &c., which are curved bars, each made to extend down from the carriage or platform and in rear of the rotary frame C and between two adjacent spades of the sets of spades, as seen in Figs. 2 and 3.

A set of wheels, R R, is connected to the rear part of the carriage, and for the purpose of regulating the depth to which the spades may be allowed to enter the earth during the revolution of the frame C.

The front end of the carriage is provided with a steering-wheel or rotary rudder, S, which is turned so as to revolve in a vertical plane in a frame, T, which is so adapted to the frame C as to be capable of being turned horizontally by means of a lever, U, extended from the journal V of the said frame T. When the rotary frame C is put in revolution while the machine is resting on land to be plowed, the earth under it will not only be dug into and raised up, but the machine will be impelled forward by the action of the rotary frame and its sets of spades. While the stud N of each set of spades is moving in contact with the outer surface of the spring-cam O, it serves to prevent the set of spades from being turned upward, or in a direction toward the rudder-wheel. It thus causes or makes the set of spades to enter into the earth in a vertical, or about in vertical, direction. After the stud N has passed by the cam N the rotation of the frame C will continue to further depress the said set of spades into the earth; but as soon as the stud passes by or beyond the influence of the cam the set of spades is free to turn in its supports, and does turn toward the steering-wheel S until arrested by its stops $g$. It then stands in a proper position to impel the carriage or machine forward and lift up the earth during further rotary movement of the frame C. The earth thus lifted up by the spades will be borne against the outside or rear curved surfaces of the clearers P P, and by them will be pressed off the spades and allowed to fall to the ground. Thus by means of the movable sets of spades provided with the studs N N and the cam O and made to move in the sectors of circles, as described, while they revolve around one common axis, the earth will not only be penetrated and lifted up, but the machine will be impelled forward, the earth dug up being thrown off the spades by the clearers, as described.

Having thus described my invention, what I claim is—

The above-described method of hanging and operating the spades D D, &c., they being applied in one or more vibrating sets to a rotary frame, C, each spade being hinged to the frame and made to turn through the sector of a circle, and provided with stops $g\ h$ and a stud, N, to act against a stationary cam, O, as described, the whole being applied together and to a carriage or frame, A, and made to operate so as not only to dig into and raise earth, but to perform the office of impelling along on the ground the whole machine, substantially as specified.

In testimony whereof I have hereto set my signature this 21st day of September, A. D. 1853.

PHILANDER SHAW.

Witnesses:
R. H. EDDY,
F. P. HALE, Jr.